Aug. 17, 1965  F. P. ALBERT ETAL  3,201,021
TRANSFER CAR
Filed April 4, 1962  2 Sheets-Sheet 1
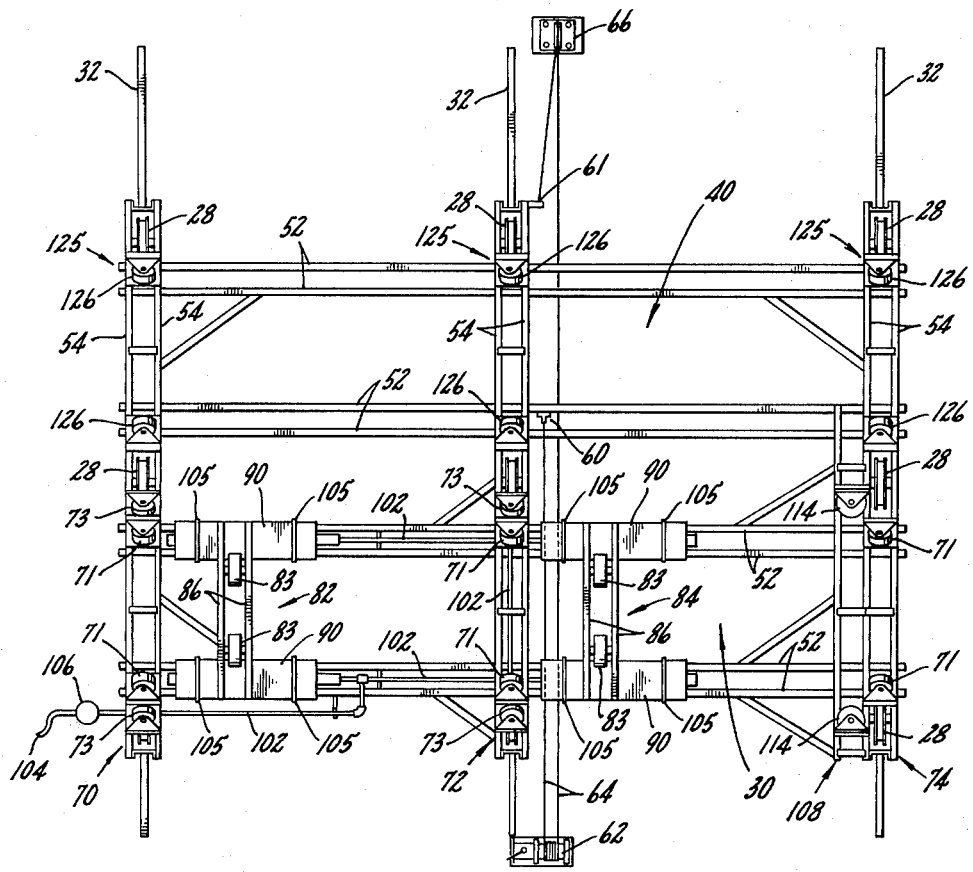
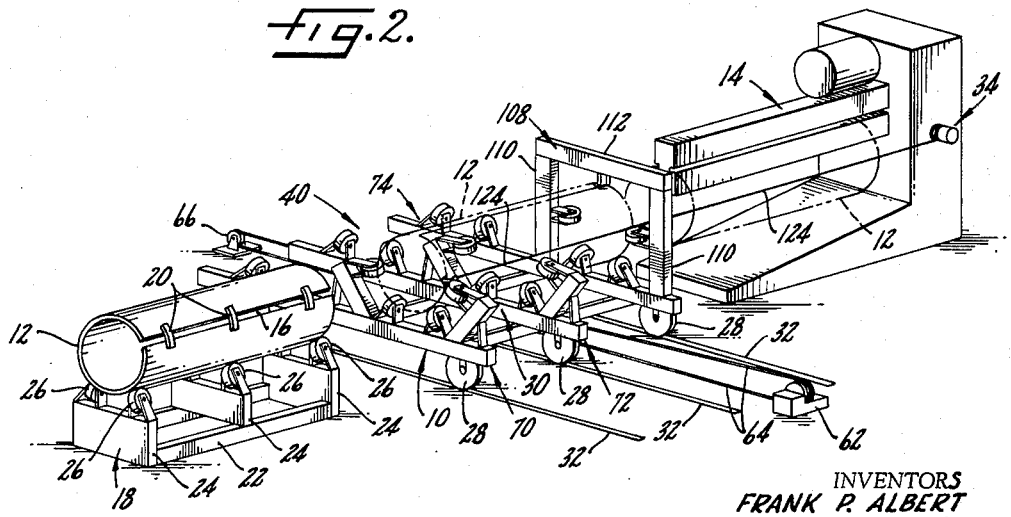
INVENTORS
FRANK P. ALBERT
LAWRENCE W. BIEKER
BY
Byron, Hume, Groen & Clement
ATTORNEYS.

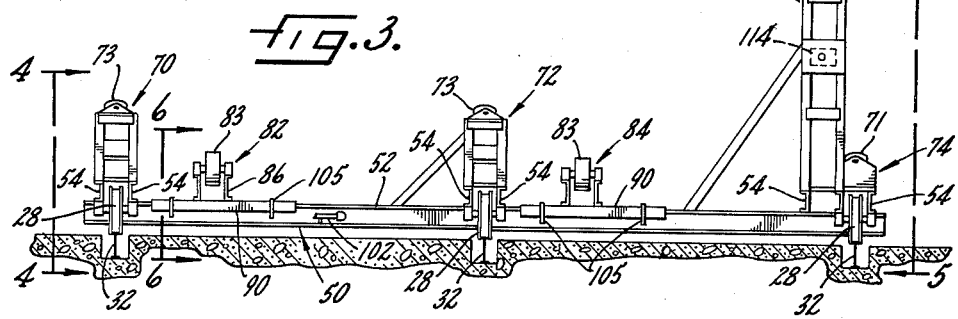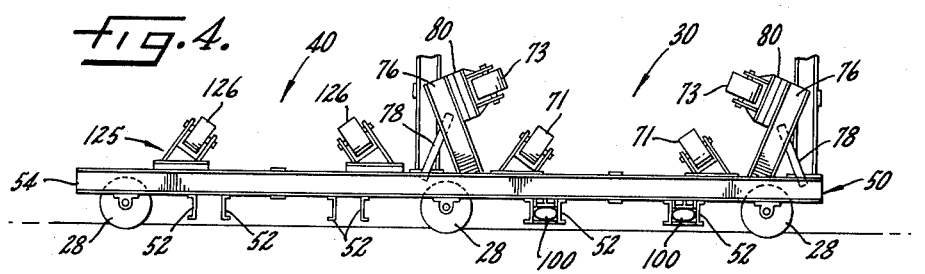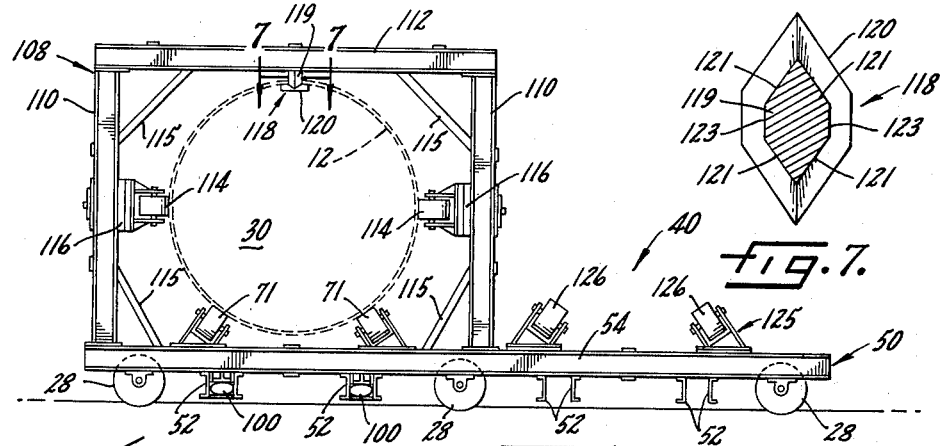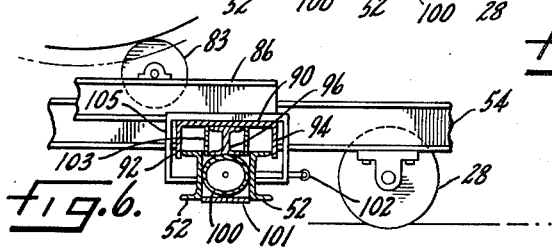

_United States Patent Office_ 3,201,021
Patented Aug. 17, 1965

3,201,021
TRANSFER CAR
Frank P. Albert, Lansing, Ill., and Lawrence W. Bieker, Munster, Ind., assignors to Union Tank Car Company, Chicago, Ill., a corporation of New Jersey
Filed Apr. 4, 1962, Ser. No. 185,005
12 Claims. (Cl. 228—49)

This invention relates to a transfer car for transporting cylindrically-shaped objects and, more particularly, to a transfer car for transporting and positioning cylindrically-shaped plates having an open seam which is to be welded to form a tank shell, pipe or the like.

During the manufacture of pipes, tank shells, and the like there is formed an unfinished rolled, cylindrically-shaped plate having an open seam. These unfinished cylindrically-shaped plates must be transferred to a closing seam welder or the like wherein the open seam is welded to form the finished pipe, tank shell or the like. These unfinished cylindrically-shaped plates have heretofore been difficult to handle since, aside from being quite large and cumbersome, they tend to spring open. Furthermore, before the unfinished cylindrically-shaped plate can be placed in a closing seam welder the open seam must be in the proper position.

It has been the customary practice in the past to prevent the unfinished cylindrically-shaped plate from springing open by clamping the open seam together or wrapping flexible bands about the unfinished plate. The plate was then manually turned until the open seam was in the proper position. Then the cylindrically-shaped plate was carried to a closing seam welder by an overhead crane. The unfinished cylindrically-shaped plate was then manually guided into the closing seam welder wherein the open seam was welded to form the finished cylindrical pipe, tank shell or the like. The bands or clamps would have to be removed manually as the plate was being carefully inserted into the closing seam welder.

It is apparent that this technique was both cumbersome and slow.

It is therefore an object of the present invention to provide a transfer car which affords a means by which cylindrically-shaped objects may be easily and conveniently transported.

It is a further object of the present invention to provide a transfer car adapted to accommodate unfinished cylindrically-shaped plates which tend to spring open.

It is a further object of the present invention to provide a transfer car adapted to transport and adjust the position of a cylindrically-shaped object, in particular, an unfinished cylindrically-shaped plate having an open seam which is to be welded to form the finished cylindrically shaped object.

It is still a further object of the present invention to provide a transfer car which will adjust the position of a cylindrically-shaped plate having an open seam extending longitudinally therethrough, so that the plate may be easily transferred therefrom into a closing seam welder without damaging the cylindrically-shaped plate or the closing seam welder.

It is still a further object of the present invention to provide a transfer car which is adapted to hold two cylindrically-shaped objects and is movable in a direction transverse to the longitudinal axes of the cylindrically-shaped objects on the transfer car.

These and other objects are realized in accordance with the present invention by providing a new and improved transfer car. In accordance with the present invention, the transfer car is adapted to support a cylindrically-shaped object. The cylindrically-shaped object is movable onto and off of the transfer car in the direction of the longitudinal axis of the cylindrically-shaped object. The transfer car is adapted to move transversely to the longitudinal axis of the cylindrically-shaped object supported thereon. Furthermore, the transfer car is adapted to rotate the cylindrically-shaped object thereon.

The invention, both as to its oganization and method of operation, taken with further objects and advantages thereof, will best be understood by reference to the following description taken in connection with the accompanying drawings, in which:

FIGURE 1 is a perspective view of a transfer car embodying the features of the present invention, the transfer car being shown in cooperative relationship with idler rolls in a storage area and a closing seam welder;

FIGURE 2 is a plan view of the transfer car illustrated in FIGURE 1;

FIGURE 3 is an elevational view of the transfer car illustrated in FIGURE 1;

FIGURE 4 is an end view of the transfer car shown in FIGURE 1 taken along line 4—4 of FIGURE 3;

FIGURE 5 is an end view of the transfer car shown in FIGURE 1 taken along line 5—5 of FIGURE 3;

FIGURE 6 is a fragmentary, enlarged cross-sectional view of the transfer car of the present invention taken along line 6—6 of FIGURE 3; and FIGURE 7 is an enlarged cross-sectional view of a seam spreader and guide means of the transfer car shown in FIGURE 1 taken along line 7—7 of FIGURE 5.

Referring now to the drawings, and more particularly to FIGURE 1, a transfer car embodying the features of the present invention is illustrated generally by reference numeral 10. Though the transfer car 10 may be utilized in many different manners to transport, adjust, position and rotate cylindrically-shaped objects, it has particular utility in processes making pipes, shell tanks or the like. One such method of making pipes or the like is disclosed and claimed in the copending application of Frank P. Albert et al., entitled "Method of Making Cylinders," Serial No. 184,982, filed April 4, 1962, and assigned to the same assignee as the present invention. Thus to illustrate the application of the transfer car 10 to transporting, rotating and positioning cylindrically-shaped objects, the transfer car 10 will be considered in detail with respect to being employed in the method of the above-identified copending application.

In the manufacture of heavy, large cylindrically-shaped objects, it is often necessary to carefully position the partially completed object, especially if the article is flexible or unstable dimensionally, so that it will enter the succeeding operations in an optimum condition for most efficient processing. In the manufacture of steel pipes or the like, in accordance with the method of the above-identified application, flat steel plates are welded together and rolled up to form a cylindrically-shaped plate having a longitudinally extending open seam which must be welded to form a pipe or the like. Such a cylindrically-shaped plate will be hereinafter referred to as an "unfinished cylinder" and is referred to generally in FIGURE 1 by reference numeral 12.

Unless the wall of the unfinished cylinder 12 is restrained the cylinder 12 will tend to spring open and therefore it is quite unwieldy and difficult to handle. Furthermore, the unfinished cylinder 12 must be inserted into a closing seam welder, indicated generally by reference numeral 14, in an optimum position for welding, i.e., its open seam 16 must be exactly at the top of the unfinished cylinder 12. In addition, the seam 16 must have a particular width as the unfinished cylinder 12 enters the closing seam welder 14 so that the unfinished cylinder 12 and/or the seam welder 14 are not damaged. Furthermore, the unfinished cylinder 12 must enter the closing seam welder 14 at exactly the proper vertical and horizontal position, otherwise it will strike various parts of the closing seams welder 14 and cause damage to the welder 14 and/or the cylinder 12. This operation must be done as rapidly as possible.

Specifically, with respect to the method disclosed in the above-identified copending application, the unfinished cylinder 12, which comes from a rolling operation or the like (not shown), is placed in a storage area awaiting the final step of the process wherein its open, longitudinally extending seam 16 is welded to form a finished cylinder. After rolling, the unfinished cylinder 12 is prevented from springing open by clamps 20. From the storage area, or directly from the rolling operation, the unfinished cylinder 12 is carried by a crane or the like to an idler roll conveyor, indicated generally by reference numeral 18.

The idler roll conveyor 18, as seen in FIGURE 1, is composed of a base 22 having a plurality of vertically extending support members 24, each of which have mounted thereon a pair of opposing rotatably mounted, adjustable wheels 26. The unfinished cylinder 12 is placed on the wheels 26 with its longitudinal axis being substantially aligned with the longitudinal axis of the idler roll conveyor 18. The longitudinal axis of the idler roll conveyor 18 is parallel to or, preferably, in alignment with the longitudinally extending axis of the closing seam welder 14.

The wheels 26 are rotatable in the direction of the longitudinal axis of the unfinished cylinder 12, their plane of rotation being substantially radial with the cylinder 12. Thus the wheels 26 extend radially inwardly toward the unfinished cylinder 12 so that it fits properly upon the wheels 26 and is supported for its entire length. Suitable adjusting means (not shown) may be provided on the idler roll conveyor 18 to adjust the position of the wheels 26 to accommodate unfinished cylinders 12 of various sizes.

The transfer car 10 is composed of a primary compartment, indicated generally by reference numeral 30, and a secondary compartment, indicated generally by reference numeral 40. The primary compartment 30 is particularly adapted to hold an unfinished cylinder 12. The secondary compartment 40 is adapted to hold a finished cylinder which has been welded in the closing seam welder 14. The transfer car 10 has wheels 28 which cooperate with tracks 32 whereby it may be moved transversely of the longitudinal axes of the idler roll conveyor 18 and the closing seam welder 14 to the right or left.

In accordance with the method of the above-identified application, the unfinished cylinder 12 is rolled from the idler roll conveyor 18 into the primary compartment 30 of the transfer car 10. Suitable means, such as a winch or the like, may be employed to transfer the unfinished cylinder 12 from the idler roll conveyor 18 to the primary compartment 30 of the transfer car 10. The clamps 20 are removed as the unfinished cylinder 12 is moved from the idler roll conveyor 18 to the transfer car 10. The primary compartment 30 of the transfer car 10 positions the unfinished cylinder 12 and prevents it from springing open.

After the unfinished cylinder 12 has been placed on the transfer car 10, if there is a cylinder in the closing seam welder 14, the transfer car 10 is moved transversely to the right when viewing FIGURE 1 to align the secondary compartment 40 with the closing seam welder 14. In the meantime, another unfinished cylinder 12 is moved from the storage area onto the idler roll conveyor 18. The finished cylinder from the closing seam welder 14 is moved by means of a winch or the like from the closing seam welder 14 into the secondary compartment 40 of the transfer car 10. The transfer car 10 is then moved transversely toward the left when viewing FIGURE 1 to align the primary compartment 30 of the transfer car 10 with the closing seam welder 14. In the meantime, the transfer car 10 has adjusted the position of the open seam 16 in the unfinished cylinder 12. Proper transverse movement of the transfer car 10 provides proper horizontal positioning of the unfinished cylinder 12 with the closing seam welder 14.

A motor driven winch, indicated generally by reference numeral 34, is connected to the unfinished cylinder 12 in the primary compartment 30 and manually actuated to pull the unfinished cylinder 12 into the closing seam welder 14. After the primary compartment 30 is emptied, another unfinished cylinder 12 is pulled from the idler roll conveyor 18 into the primary compartment 30. It is, of course, preferable that the idler roll conveyor 18 and the closing seam welder 14 be in longitudinal alignment, as this eliminates additional movement of the transfer car 10.

After another unfinished cylinder 12 has been placed in the primary compartment 30 and the finished cylinder removed from the secondary compartment 40, the transfer car 10 is again moved transversely along the tracks 32 to the right, when viewing FIGURE 1, to align the secondary compartment 40 with the closing seam welder 14. In this manner, the secondary compartment 40 is thereby in a position to receive the finished cylinder from the closing seam welder 14 in the manner described hereinbefore. This sequence of operations is continued whereby unfinished cylinders 12 are continually transferred by the transfer car 10 into the closing seam welder 14 and finished cylinders are removed from the closing seam welder 14 and placed in the secondary compartment 40. The finished cylinder is removed from the secondary compartment 40 by a crane or the like and placed in storage.

Referring now to FIGURES 1-6 the transfer car 10 will be considered in more detail. The transfer car 10 is adapted, among other things, to slidably receive the unfinished cylinder 12, to properly position it horizontally with respect to the closing seam welder 14, to prevent the unfinished cylinder 12 from springing open and to allow it to be slidably removed therefrom.

To these ends the transfer car 10 includes a frame indicated generally by reference numeral 50. The frame 50 is composed of longitudinally extending members 52 and transversely extending members 54 suitably secured together by welding or the like. The transversely extending members 54 may be I-beams, angle irons or the like, though in this instance channel beams have been employed in opposing paired relationships. Likewise the longitudinally extending members 52 may be steel I-beams, angle irons, channel beams or the like, but it is preferable, as will be more apparent hereinafter, that channel beams be employed in opposing paired relationship as best seen in FIGURES 4-6. The frame 50 has wheels 28 suitably secured to the bottom portion thereof which ride upon tracks 32 to allow the transfer car 10 to be moved in a direction transverse to the axis of the cylinders supported on the transfer car 10.

Suitable means may be provided to move the transfer car 10 upon the tracks 32, such as a winch arrangement shown in FIGURES 1 and 2. This arrangement includes a winch 62 upon which a steel cable or the like 64 is wound. One end of the cable 64 is directly attached to the frame 50 at 60 and the other end of the cable 64 passes over a pulley 66 and is attached to the frame 50 at 61. The cable 64 runs beneath the frame 50 so as not to obstruct the primary or secondary compartments.

In this manner upon rotation of the winch 62 the transfer car 10 is moved transversely of the idler roll conveyor 18 and the closing seam welder 14, the particular direction of movement depending upon the direction of the rotation of the winch 62. It will be understood that a motor (not shown) may be employed to rotate the winch 62 to effect this transverse movement of the transfer car 10.

The transfer car 10 is composed of a primary compartment 30 and a secondary compartment 40, these compartments extending longitudinally substantially parallel to one another. The primary compartment 30 includes a plurality of rows of cooperating wheels, these rows being indicated generally by reference numerals 70, 72 and 74. As shown in FIGURE 2 each row 70, 72 and 74 includes a pair of opposing, adjustably mounted supporting wheels 71. The supporting wheels 71 principally support the unfinished cylinder 12 when it is in the primary compartment 30. In addition, the rows 70 and 72 have an opposing pair of wheels 73 which act against the lateral surface of the unfinished cylinder 12 and thereby act to position and prevent opening of the unfinished cylinder 12. All the wheels 71 and 73 are mounted to rotate in a direction parallel to the longitudinal axis of the unfinished cylinder 12 and have a plane of rotation substantially radial with the unfinished cylinder 12. In this manner, the wheels 71 and 73 of the rows 70 and 72 form arcs which conform to the desired diameter of the unfinished cylinder 12. Rows 70 and 72 therefore assist in preventing the unfinished cylinder 12 from springing open.

The supporting wheels 71 may be mounted directly on the frame 50 of the transfer car 10. The laterally mounted wheels 73 in the rows 70 and 72 are mounted upon upwardly extending supporting members 76 (FIGURE 4) secured by suitable means to the frame 50. Braces 78 may be provided to support the members 76. The upwardly extending members 76 may be made of I-beams, channel beams, angle iron or the like, as may be the supporting braces 78.

The rows 70, 72 and 74 are longitudinally spaced from one another to support the unfinished cylinder 12 along its entire length. The wheels 71 and 73 are adjustably mounted in order that they may be moved radially inwardly or outwardly by the addition or removal of shims 80 or the like.

During operation the unfinished cylinder 12 from the idler roll conveyor 18 is drawn into the primary compartment 30 of the transfer car 10 by suitable means (not shown) such that it is supported by the wheels 71 and 73 in the rows 70 and 72.

In most instances, at this stage of the operation, the open seam 16 of the unfinished cylinder 12 is not properly positioned with respect to the closing seam welder 14. Generally speaking the closing seam welder 14 requires that the open seam 16 be at the top of the unfinished cylinder 12, i.e., in a vertical position. It is therefore often necessary to rotate the unfinished cylinder 12 to properly position its open seam 16 prior to the unfinished cylinder 12 being passed from the transfer car 10 into the closing seam welder 14.

To these ends the transfer car 10 is provided with a pair of retractable roller assemblies indicated generally by reference numerals 82 and 84, respectively. These retractable roller assemblies are longitudinally spaced from one another and are best seen in FIGURES 2, 3 and 6.

The retractable roller assembly 82 includes a pair of wheels 83 which are rotatable about an axis substantially parallel to the longitudinal axis of the unfinished cylinder 12 in the primary compartment 30. These wheels 83 are supported upon transversely disposed members 86, such as channel beams or the like, having their ends supported by channel-shaped cover members 90 having downwardly extending legs 92 and 94 (see FIGURE 6). The legs 92 and 94 extend downwardly over an opposing pair of the longitudinally extending support members 52 of the frame 50.

Supported between the longitudinally extending members 52 is an elongated, flexible inflatable member 100, such as a section of fire hose or the like. It rests upon a bottom member 101 suitably secured to the support members 52. Resting on the inflatable member 100 and guided by the members 52 is a lifting member 96 made of an I-beam or the like having guiding members 103 secured to the flanges of the lifting member 96. The lifting member 96 may be secured to the cover member 90. Depending upon the extent to which the inflatable member 100 is inflated, the cover member 90 rests upon the lifting member 96, the longitudinally extending members 52, or both. It will be understood that both ends of the members 86 are supported in the same manner.

The inflatable members 100 are connected to an air supply line, indicated generally by reference numeral 102, which in turn is connected, through a valve 106, to a flexible hose 104 communicating with a suitable source of pressurized air (not shown). In this manner, by proper positioning of the valve 106, pressurized air is passed through line 102 to all the inflatable members 100, whereby the inflatable members 100 expand and force the lifting members 96, the supporting members 86 and the wheels 83 upwardly to lift the cylinder 12 off of the rollers 71 and 73. Limit means 105 prevent the cover 90 and the lifting means 96 from moving vertically past a predetermined height. The limit means 105 may be made of a steel bar or the like which is suitably secured to the members 52 and extends around and above the cover member 90 as shown in FIGURE 6. FIGURE 6 illustrates the position of the wheels 83 when the inflated member 100 has been expanded such that the cover member 90 is contacting the limit means 105. Once this has been accomplished a motor (not shown) in the roller assembly 82 is actuated to rotate the wheels 83 whereby the wheels 83 rotate the cylinder 12 until the open seam 16 of the cylinder 12 is in a vertical position.

The retractable roller assembly 84 is the same as the roller assembly 82 with the exception that its wheels 83 are freely rotatable, rather than motor driven. However, if desired the wheels 83 of the roller assembly 84 may also be power driven.

It will be understood that the inflatable member 100 may be made of a section of fire hose or the like. In such an instance one end of the hose is adapted to receive the piping 102, the other end being closed by a clamp or the like to prevent air from escaping from the hose. After the desired rotation of the cylinder 12 has been effected the valve 106 may be turned to exhaust the air in the line 102 to the atmosphere or to any other suitable source whereby the members 100 deflate and the cylinder 12 is lowered back onto the wheels 71 and 73 in the rows 70 and 72. In such an instance the downward movement of the wheels 83 is stopped when the cover member 90 rests on the supporting members 52.

It will be noted by this arrangement that the retractable roller assemblies 82 and 84 are thereby subjected to substantially the same pressures from the line 102 and therefore will tend to equally elevate the cylinder 12 and hold it in a substantially horizontal position.

After the cylinder 12 has been rotated to the proper position and the roller assemblies 82 and 84 retracted whereby the unfinished cylinder 12 rests upon the wheels 71 and 73 of the rows 70 and 72, the unfinished cylinder 12 is moved into cooperative engagement with a vertically extending head frame assembly 108 and the row 74 of wheels 71.

The head frame assembly 108 holds the seam 16 in proper position and assures that as the unfinished cylinder 12 is loaded into the closing seam welder 14 the open seam 16 has the proper width thereby assuring that the diameter of the cylinder 12 will not open such that it would cause damaging contact with the closing seam welder 14.

The head frame assembly 108 of the primary compartment 30 is mounted upon the frame 50. It includes two vertically extending members 110 and a substantially horizontally extending member 112 suitably secured together by welding or the like. Braces 115 may be employed if desired. Extending inwardly from and mounted upon the vertically extending members 110 of the head frame assembly 108 are two opposing wheels 114 similar to the wheels 71 and 73 discussed hereinbefore.

Suitable shims 116 are provided between the wheels 114 and the vertically extending legs 110 in order that the distance between the opposing wheels 114 may be adjusted as desired. The wheels 114 are rotatable in the longitudinal direction of the cylinder 12 and their plane of rotation is substantially horizontal and radial with the cylinder 12. These wheels 114 make the final fine adjustment of the cylinder 12 before it goes into the closing seam welder 14.

Extending downwardly from and attached to the horizontal frame member 112 is a seam spreader and guide means 118 which spreads the seam 16 to the desired open width and properly positions the seam 16 with respect to the welder 14. To these ends, the seam spreader and guide means 118 includes a vertically disposed member 119 having tapered leading and trailing edges 121 and intermediate sides 123. The distance between the intermediate sides 123 is the desired width of the open seam 16. The vertical member 119 is attached to the frame assembly 108. A horizontally disposed holding member 120, which is curved to conform substantially to the inside diameter of the unfinished cylinder 12, is attached to the free end of the member 119. As the unfinished cylinder 12 is moved into the head frame 108, the member 119 enters the open seam 16 and the holding member 120 enters the interior of the unfinished cylinder 12. The member 119 spreads the open seam 16 to the desired width as the free edges of the cylinder 12 run along the edges 121 and the sides 123 thereof. Furthermore, the member 119 serves to finally adjust the position of the open seam 16 with respect to the closing seam welder 14. The holding member 120 assists in holding the unfinished cylinder 12 in proper position. The wheels 114 and the wheels 71 of the row 74 cooperate with the seam spreader and guide means 118 to assure that the open seam 16 has a particular width as the unfinished cylinder 12 is placed over a mandrel (not shown) in the closing seam welder 14. The mandrel holds the unfinished cylinder 12 in proper position as the seam 16 is welded by the closing seam welder 14 to form the finished cylinder.

The member 118 has been designed so that as the leading edges thereof are worn down it may be reversed to obtain the same results.

To assist in rolling the unfinished cylinder 12 from the transfer car 10 to the closing seam welder 14 a winch assembly, indicated generally by reference numeral 34, is mounted upon the closing seam welder 14. The winch assembly 34 includes a cable 124 with a hook or the like at the end thereof which, for example, is hooked to the remote end of the unfinished cylinder 12 as shown in FIGURE 1. Upon actuation of the motor driven winch assembly 34 the unfinished cylinder 12 is pulled into the closing seam welder 14, the head frame assembly 108 assuring that the seam 16 is properly positioned and that the cylinder 12 does not open up. Another winch assembly (not shown) is employed to withdraw the finished cylinder from the closing seam welder 14 into the secondary compartment 40 of the transfer car 10.

After the unfinished cylinder 12 has its open seam 16 welded in the closing seam welder 14, the finished cylinder is withdrawn from the closing seam welder 14 and rolled into the secondary compartment 40 of the transfer car 10. The transfer car 10 is, of course, moved transversely to align the secondary compartment 40 with the closing seam welder 14 before the finished cylinder is placed therein.

The secondary compartment 40 is provided with a plurality fo rows 125 of opposing wheels 126 suitably mounted upon the frame 50. These rows 125 are substantially the same as the row 74 discussed hereinbefore and are spaced longitudinally from one another to provide support for the finished cylinder along its entire length. The wheels 126 are rotated in a direction longitudinal to the finished cylinder and have a plane of rotation generally radial to the finished cylinder. The wheels 126 may be adjustably supported if desired to accommodate varying diameter cylinders withdrawn from the closing seam welder 14. However, as the cylinders to be received by the secondary compartment 40 are completed and will not spring open, it is not essential that the wheels 126 be as precisely positioned as those of the primary compartment 30.

It will be understood that "wheels" as used herein could include rubber wheels, metal wheels, rollers, spherical balls or the like which are retractable in accordance with the requirements discussed above.

Furthermore, it will be understood that the vertical height of the cylindrically-shaped objects may be altered by moving the opposing wheels further apart or closer together depending upon the desired adjustment.

While the embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A transfer car for supporting and transporting a cylindrically-shaped object, said transfer car comprising a frame having wheels associated therewith whereby said cylindrically-shaped object supported by said transfer car may be moved in a direction transverse to the longitudinal axis of said cylindrically-shaped objects, a plurality of longitudinally spaced, opposing wheels mounted on said frame, said wheels being rotatable in a direction longitudinal to the axis of said cylindrically-shaped object and having a plane of rotation substantially radial to said cylindrically-shaped object, means for lifting said cylindrically-shaped object from said wheels, said lifting means including second wheels rotatable in a direction transverse to said axis of said cylindrically-shaped object whereby rotation of said second wheels will rotate said cylindrically-shaped object, said lifting means including an elongated, flexible, inflatable member which may be expanded by a pressurized fluid to cause said lifting means to support said cylindrically-shaped object on said second wheels.

2. A transfer car for transporting an unfinished cylinder which comprises a frame, means associated with said frame for moving said transfer car, a plurality of longitudinally spaced, opposing wheels, said wheels being rotatable in a direction longitudinal to said unfinished cylinder and having a plane of rotation substantially radial to said unfinished cylinder whereby said unfinished cylinder may be rolled onto and off of said transfer car, a head frame assembly mounted upon said frame and including a seam spreader and guide means, said seam spreader and guide means opening a seam in said unfinished cylinder to the desired width and guiding said seam as said unfinished cylinder is rolled from said transfer car.

3. The transfer car of claim 2 wherein lifting means are provided to vertically move said unfinished cylinder from said wheels, said lifting means including second wheels rotatable in a direction transverse to said axis of said unfinished cylinder whereby rotation of said second wheels rotates said unfinished cylinder when said unfinished cylinder has been lifted off of said wheels.

4. The transfer car of claim 3 wherein said lifting means includes an inflatable member which may be expanded by a pressurized fluid to cause vertical movement of said second wheels whereby said second wheels support and vertically lift said unfinished cylinder from said wheels on said transfer car.

5. The transfer car of claim 2 wherein said seam spreader and guide means extend into said open seam to open said seam to the desired width and guide said seam as said unfinished cylinder is rolled from said transfer car.

6. The transfer car of claim 5 wherein said seam spreader and guide means includes a vertically disposed member having tapered leading edges and a horizontally disposed member, said horizontally disposed member being curved to substantially conform to the interior diameter of said unfinished cylinder, whereby said tapered edges enter said open seam and said horizontally disposed member enters the interior of said unfinished cylinder, said tapered edges opening said seam to the desired width and said horizontally disposed member holding said unfinished cylinder on said seam spreader and guide means.

7. The transfer car of claim 2 wherein longitudinally-spaced first and second means for lifting said unfinished cylinder from said wheels are provided, said first and second lifting means each including a transversely disposed member having mounted thereon second wheels rotatable in a direction transverse to said axis of said unfinished cylinder, said transversely disposed members each having two free ends, said free ends each being supported by a cover member having a lifting member attached thereto, means to support said cover members, said lifting member resting upon an inflatable member, each of said inflatable members being connected to a source of pressurized fluid so that said inflatable members may be expanded by said pressurized fluid to cause said lifting member to move upwardly and thereby cause said first and second lifting means to support said unfinished cylinder on said second wheels.

8. A transfer car for transporting an unfinished cylinder which comprises a frame, means associated with said frame for moving said transfer car, a plurality of longitudinally spaced opposing wheels mounted on said frame, said wheels being rotatable in a direction longitudinal to said unfinished cylinder and having a plane of rotation substantially radial to said unfinished cylinder whereby said unfinished cylinder may be rolled onto and off of said transfer car, lifting means associated with said transfer car, said lifting means including two pair of retractable wheels, said retractable wheels being rotatable about axes parallel to the longitudinal axis of said unfinished cylinder, each pair of retractable wheels being mounted upon supporting means, each end of said supporting means being movable in a vertical direction by an inflatable member, said inflatable member being expanded by the introduction of pressurized fluid therein whereby said retractable wheels are moved upwardly to lift said unfinished cylinder from said wheels.

9. The transfer car of claim 8 wherein said inflatable member is mounted within a confined chamber, means in said chamber upon said inflatable member which is moved out of said chamber as said inflatable member is expanded by pressurized fluid, the movement of said means from said chamber causing said retractable wheels to lift said unfinished cylinder from said wheels.

10. A transfer car for use in making a cylindrically-shaped object wherein an unfinished cylinder is passed to a closing seam welder and removed therefrom as a finished cylinder, said transfer car including a primary and a secondary compartment, said primary compartment having rotatable means to support said unfinished cylinder, means to lift said cylinder from said support means and rotate said unfinished cylinder to properly position an open seam in said unfinished cylinder, and means in said primary compartment for opening said seam to the desired width and properly aligning said seam with said closing seam welder as said unfinished cylinder is rolled from said primary compartment to said closing seam welder, said secondary compartment including rotatable means to support said finished cylinder from said closing seam welder, said rotatable support means in said primary and said secondary compartments including a plurality of longitudinally spaced, opposing wheels, said wheels being rotatable in a direction longitudinal to said unfinished and finished cylinders and having a plane of rotation substantially radial to said unfinished and finished cylinders.

11. The transfer car of claim 10 wherein longitudinally-spaced first and second means for lifting said cylindrically-shaped object from said wheels are provided, said first and second lifting means each including a transversely disposed member having mounted thereon second wheels rotatable in a direction transverse to said axis of said cylindrically-shaped object, said transversely disposed members each having two free ends, said free ends each being supported by a cover member having a lifting member attached thereto, means to support said cover members, said lifting member resting upon an inflatable member, each of said inflatable members being connected to a source of pressurized fluid so that said inflatable members may be expanded by said pressurized fluid to cause said lifting member to move upwardly and thereby cause said first and second lifting means to support said cylindrically-shaped object on said second wheels.

12. A transfer car for supporting and transporting a cylindrically-shaped object, said transfer car comprising a frame having wheels associated therewith whereby said cylindrically-shaped object supported by said transfer car may be moved in a direction transverse to the longitudinal axis of said cylindrically-shaped objects, a plurality of longitudinally-spaced, opposed wheels mounted on said frame, said wheels being rotatable in a direction longitudinal to the axis of said cylindrically-shaped object and having a plane of rotation substantially radial to said cylindrically-shaped object, longitudinally-spaced first and second means for lifting said cylindrically-shaped object from said wheels, said first and second lifting means each including a transversely disposed member having mounted thereon second wheels rotatable in a direction transverse to said axis of said cylindrically-shaped object, said transversely disposed members each having two free ends, said free ends each being supported by a cover member having a lifting member attached thereto, means to support said cover members, said lifting member resting upon an elongated, flexible, inflatable member, each of said inflatable members being connected to a source of pressurized fluid so that said inflatable members may be expanded by said pressurized fluid to cause said lifting member to move upwardly and thereby cause said first and second lifting means to support said cylindrically-shaped object on said second wheels.

References Cited by the Examiner

UNITED STATES PATENTS

| | | | |
|---|---|---|---|
| 1,980,164 | 11/34 | Boyle et al. | 113—131 |
| 2,829,697 | 4/58 | Rockhoff et al. | 153—77 |
| 2,845,038 | 7/58 | Crawford | 113—131 |
| 2,894,450 | 7/59 | Steinitz | 214—340 |

CHARLES W. LANHAM, *Primary Examiner.*

MICHAEL V. BRINDISI, *Examiner.*